(12) United States Patent
Horiuchi

(10) Patent No.: US 7,047,376 B2
(45) Date of Patent: May 16, 2006

(54) BACKUP SYSTEM AND METHOD AND PROGRAM

(75) Inventor: Takashi Horiuchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 175 days.

(21) Appl. No.: 10/874,247

(22) Filed: Jun. 24, 2004

(65) Prior Publication Data

US 2005/0138310 A1    Jun. 23, 2005

(30) Foreign Application Priority Data

Dec. 17, 2003   (JP)   ............................. 2003-419162

(51) Int. Cl.
*G06F 12/16*   (2006.01)

(52) U.S. Cl. .................. 711/161; 711/162; 711/100; 711/111; 711/112; 714/6; 714/7; 714/8; 714/15; 714/16; 714/19; 714/20; 370/428; 370/522; 370/338

(58) Field of Classification Search ......... 711/161–162
See application file for complete search history.

(56) References Cited

U.S. PATENT DOCUMENTS

| | | | | |
|---|---|---|---|---|
| 5,802,554 A | * | 9/1998 | Caceres et al. ............. | 711/103 |
| 6,148,383 A | * | 11/2000 | Micka et al. ............... | 711/162 |
| 6,374,266 B1 | * | 4/2002 | Shnelvar ..................... | 707/204 |
| 6,397,292 B1 | * | 5/2002 | Venkatesh et al. .......... | 711/114 |
| 6,601,187 B1 | * | 7/2003 | Sicola et al. .................... | 714/6 |
| 6,643,750 B1 | | 11/2003 | Achiwa et al. | |
| 6,662,281 B1 | * | 12/2003 | Ballard et al. .............. | 711/162 |
| 6,889,297 B1 | * | 5/2005 | Krapp et al. ................ | 711/159 |
| 2002/0065998 A1 | * | 5/2002 | Buckland ..................... | 711/162 |
| 2003/0204609 A1 | | 10/2003 | Anderson et al. | |
| 2003/0220920 A1 | | 11/2003 | Lake et al. | |
| 2004/0019751 A1 | * | 1/2004 | Sharma et al. .............. | 711/154 |
| 2004/0044842 A1 | | 3/2004 | Trimmer et al. | |
| 2004/0044863 A1 | | 3/2004 | Trimmer et al. | |
| 2004/0174894 A1 | * | 9/2004 | Sun et al. ..................... | 370/428 |
| 2005/0097289 A1 | * | 5/2005 | Burton et al. ................ | 711/162 |

FOREIGN PATENT DOCUMENTS

| | | |
|---|---|---|
| EP | 0672985 A1 | 9/1994 |
| EP | 0671686 A1 | 9/1995 |
| JP | 9-330262 | 12/1997 |

* cited by examiner

*Primary Examiner*—B. James Peikari
*Assistant Examiner*—Zhuo H. Li
(74) *Attorney, Agent, or Firm*—Mattingly, Stanger, Malur & Brundidge, P.C.

(57) ABSTRACT

A remote site stores data received from a currently-used site and transfers the stored data to a proximal site. The proximal site stores the data received from the remote site and transfers the stored data to the currently-used site. The currently-used site crosschecks the data returned from the proximal site against the data transmitted to the remote site, and when the two data do not match each other, transmits the data to the remote site again.

21 Claims, 14 Drawing Sheets

Fig.5

|  | POST-RECEPTION PROCESSING | DATA TRANSFER DESTINATION |
|---|---|---|
| CURRENTLY-USED SITE | CROSSCHECK, TRANSFER | REMOTE SITE |
| PROXIMAL SITE | WRITE, TRANSFER | CURRENTLY-USED SITE |
| REMOTE SITE | WRITE, TRANSFER | PROXIMAL SITE |

BACKUP SYSTEM AND METHOD AND PROGRAM

CLAIM OF PRIORITY

The present application claims priority from Japanese application P2003-419162 filed on Dec. 17, 2003, the content of which is hereby incorporated by reference into this application.

BACKGROUND

The present invention relates to a backup technology for data in a storage system or a server, and more specifically to a technology of asynchronous data update between plural sites.

Databases and web sites avoid data redundancy by taking a backup and storing the backup data in physically different storage system. For instance, data of a site that is currently in use (hereinafter referred to as currently-used site) is transferred to a storage system on a site located in a geographically remote place (hereinafter referred to as remote site) and the data is updated so that the backup data on the remote site can be used to avoid losing data of the currently-used site over calamities such as earthquake in case the effectiveness of the currently-used site is impaired.

Such data backup systems known to this point are divided into synchronous backup systems (EP 0671686 A1) with which a data update on a remote site is synchronous with a data update on a currently-used site and asynchronous backup systems (EP 0672985 A1) with which a data update on a currently-used site is followed by a data update on a remote site.

SUMMARY

However, the prior art described above has no consideration for crosschecking whether or not data transmitted from a currently-used site to a remote site is correctly backed up on the remote site.

An object of the present invention provides a technology of crosschecking that data is backed up correctly between plural sites.

According to the aspect of the present invention, data transmitted from a site is backed up on a first backup site and a second backup site. The first backup site stores the data received from the sender site and transfers the stored data to the second backup site. The second backup site stores the data received from the first backup site and transfers the stored data to the sender site. The sender site crosschecks the data returned from the second backup site against the data transmitted to the first backup site and, when the two do not match, transmits the data to be backed up to the first backup site once again.

In this way, correct data backup between plural sites can be confirmed by a sender of backup data which transmits the backup data to a single site and which crosschecks returned data against the data transmitted.

BRIEF DESCRIPTION OF THE DRAWING

FIG. 5 is an explanatory diagram showing an example of a role definition table.

DETAILED DESCRIPTION OF THE PREFERRED EMBODIMENTS

An embodiment of the present invention will be described below with reference to the accompanying drawings.

Figure 1:
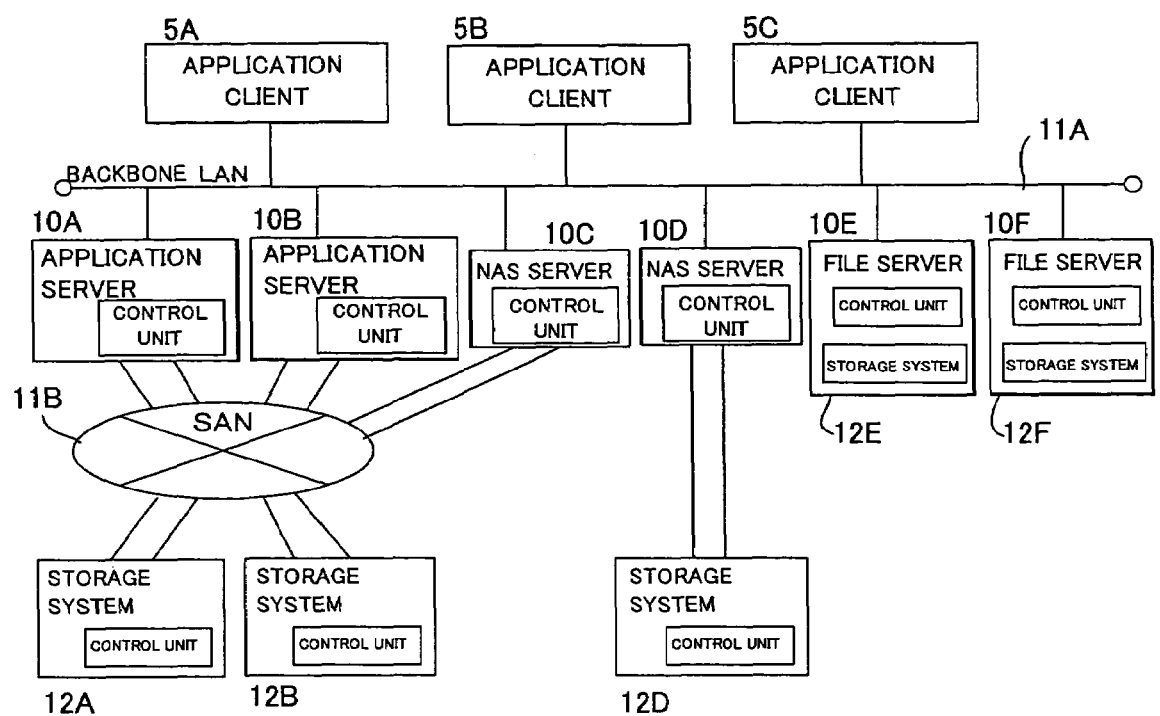
FIG. 1 is a block diagram showing the overall structure of a system.
Figure 2:
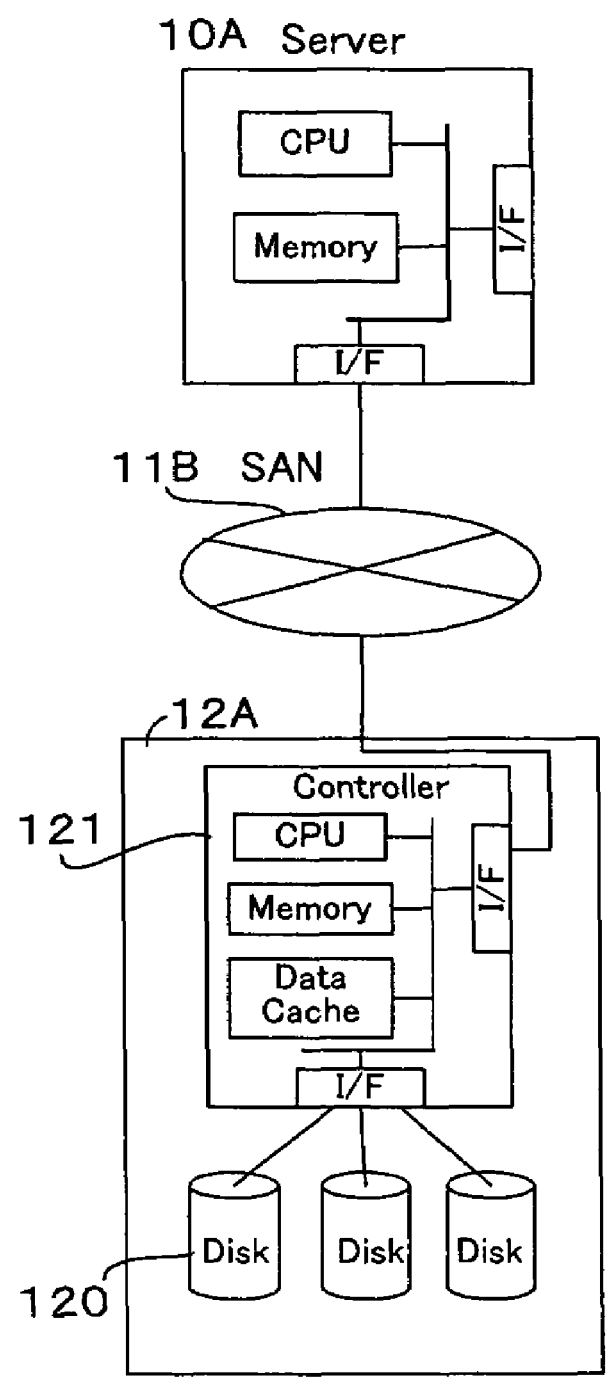
FIG. 2 is a block diagram showing an example of a currently-used site.
Figure 3:
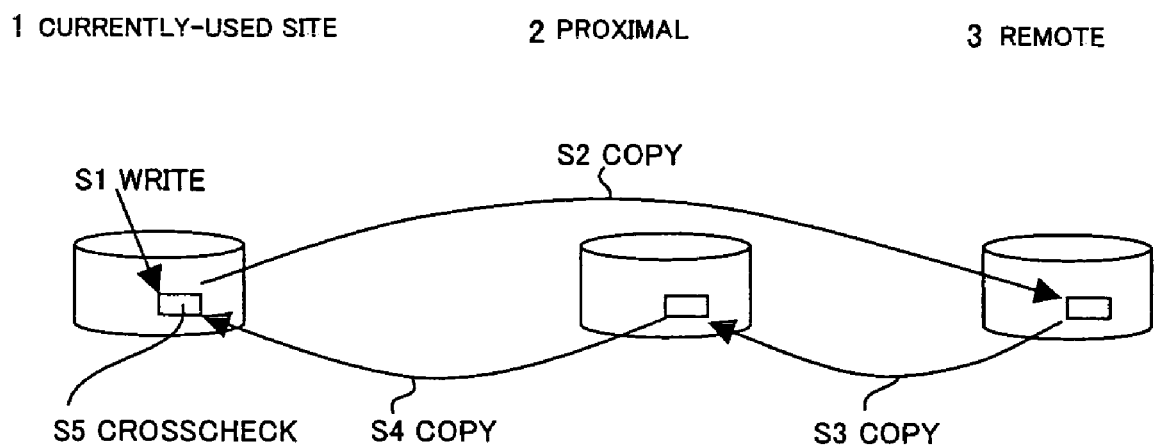
FIG. 3 is an explanatory diagram showing a data flow for data backup between three geographically different sites.

FIGS. 1 to 3 are block diagrams showing the overall structure of a system to which the present invention is applied. FIG. 1 is a block diagram showing the structure of a certain site. FIG. 2 is a block diagram showing the relation between a server and a storage system of FIG. 1. FIG. 3 shows an example in which a currently-used site 1, a proximal site 2, and a remote site 3 are located in three geographically different places and data of the currently-used site 1 is backed up to the proximal site 2 and the remote site 3.

FIG. 1 is a block diagram showing an example of the currently-used site 1 of FIG. 3.

As the example in FIG. 1 shows, the currently-used site 1 of FIG. 3 has an intra network composed of a backbone LAN (Local Area Network) 11A and an SAN (Storage Area Network) 11B. The backbone LAN 11A is connected to an external network (omitted from the drawing) such as Internet and WAN through a not-shown gateway (e.g., router).

Various servers 10A to 10F are connected to the backbone LAN 11A to process and accumulate information upon request from application clients (client computers) 5A, 5B and 5C, which are also connected to the backbone LAN 11A.

The various servers 10A to 10F are connected to storage systems in a manner described below.

Application servers 10A and 10B are connected via the SAN 11B to storage systems 12A and 12B, so that the serves 10A and 10B can read and write data in the storage systems 12A and 12B.

An NAS server 10C is connected via the SAN 11B to the storage systems 12A and 12B, so that the NAS server 10C can read and write data in the storage systems 12A and 12B upon request from the application clients 5A to 5C.

An NAS server 10D is connected to a storage system 12D, so that the NAS server 10D can read and write data in the storage system 12D upon request from the application clients 5A to 5C.

File servers 10E and 10F are locally connected to storage systems 12E and 12F, respectively. The file server 10E reads and writes data in the storage system 12E upon request from the application clients 5A to 5C. The file server 10F reads and writes data in the storage system 12F upon request from the application clients 5A to 5C.

The servers 10A to 10F use software, which is described later, to back up data in the storage systems 12A to 12F to the proximal site 2 and the remote site 3 shown in FIG. 3.

Similar to the currently-used site 1, the proximal site 2 and the remote site 3 of FIG. 3 can have the structure shown in FIG. 1.

FIG. 2 is a detailed block diagram showing the relation between the application server 10A and the storage system 12A which constitute the currently-used site 1.

The application server 10A has interfaces (referred to as I/F in the drawings) connected to a CPU, a memory, an external network, and an intra network 11A. The storage system 12A has a control unit 121 which includes an interface connected to a CPU, a memory, a cache memory (data cache), and an intra network 11B, and an interface connected to disk drives 120. The application server 10A also has a display system and an input system which are not shown in the drawing.

Receiving a request from a client, which is described later, or the like, the application server 10A reads or writes data in the SAN storage system 12A and, when a data update takes place, transfers data to the proximal site 2 and the remote site 3 for backup as will be described below. The application server 10A may have local disk drives as the file servers 10E and 10F of FIG. 1 have.

Given below is an example in which the application server 10A and the storage system 12A of FIGS. 1 and 2 are provided in each of the sites shown in FIG. 3 to exchange data among the sites for backup. It is assumed for a simpler explanation that the application server 10A, the SAN 11B, and the storage system 12A are provided in each of the currently-used site 1, the proximal site 2, and the remote site 3 shown in FIG. 3 and that a backup system is run on the application server 10A of each site.

The application server 10A and the storage system 12A, which are connected to each other via the SAN 11B in FIGS. 1 and 2, may be connected through a LAN or an original network instead of the SAN 11B. The intra network 11A, which is a LAN in FIG. 1, may be composed of an IP network.

FIG. 3 is an explanatory diagram showing a data flow for data backup between three geographically different sites.

In the backup system of the present invention, data writing in the storage systems 12A of the currently-used site 1 (S1 in the drawing) is followed by transfer (copying) of the written data to the remote site 3 (S2 in the drawing).

The remote site 3 writes the data received from the currently-used site 1 in a storage system (for example, the storage system 12A of FIG. 1) and then transfers (copies) the written data to the proximal site 2 (S3 in the drawing). The proximal site 2 writes the data received from the remote site 3 in a storage system (for example, the storage system 12A of FIG. 1) and then transfers (copies) the written data to the currently-used site 1 (S4 in the drawing).

The currently-used site 1 crosschecks the data received from the proximal site 2 against the data transmitted to the remote site 3 in step S2 to find out whether the data written in the remote site 3 and the proximal site 2 is correct or not (S5 in the drawing). When it is found as a result of the crosscheck that the written data is not correct, the currently-used site 1 transmits data to be backed up to the remote site 3 once more.

In other words, a site serving as a sender (the currently-used site 1) transmits data to be backed up to sites to which the data is backed up (the proximal site 2 and the remote site 3), data written to the backup destination sites is transferred to the sender site for data looping and, as the data looping is completed, the data transmitted from the sender and the data that is backed up last are compared to each other for crosscheck.

This makes it possible to ensure data consistency while avoiding an increase in load of the sender where data is being updated and backed up. In short, the present invention makes backup destination sites daisy-chained from one site that serves as a sender, thereby allowing the sender site to take a backup at minimum load irrespective of the number of backup destination sites.

A site is composed of a data processing devices which includes a computer such as a server, a storage system for storing data, and a network for connecting the computer and the storage system to each other, or for interconnecting computers, or for interconnecting storage systems. The currently-used site 1 is a site that has data to be backed up, which is stored, for example, by the application server 10A in the storage system 12A connected to the application server 10A via the intra network (SAN or LAN) 11B.

Figure 4:
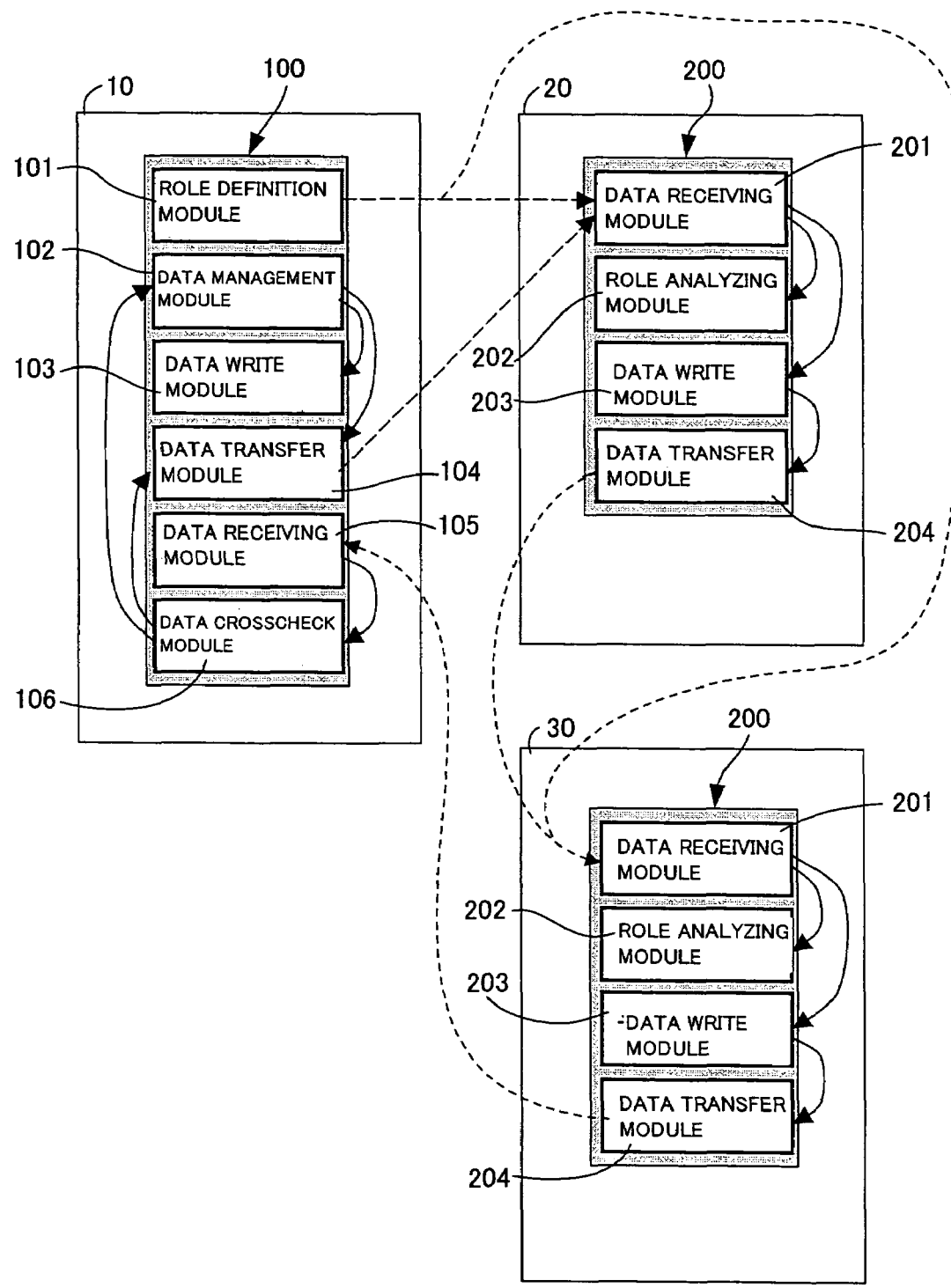
FIG. 4 is a block diagram showing software configurations of a currently-used site, a proximal site, and a remote site.

Software configurations of the currently-used site 1, the proximal site 2, and the remote site 3 are shown in FIG. 4.

Components in FIG. 4 are roughly divided into two: a software group 100 of the currently-used site 1 which serves as a sender of data to be backed up and a software group 200 of the proximal site 2 and the remote site 3 to which the data from the currently-used site 1 is backed up. The software groups 100 and 200 are executed by the application server 10A shown in FIG. 1.

The structure of the software group 100 is described first. The software group 100 of the currently-used site 1, which transmits written data and crosschecks data returned from a backup destination site, is composed of six modules: a role definition module 101 for determining the role of each site, a data management module 102 for managing data written in the storage system 12A and data to be transmitted, a data write module 103 for writing data in the storage system 12A, data transfer module 104 for transmitting data written in the storage system 12A to a backup destination, a data receiving module 105 for receiving data returned from a backup destination by looping, and a crosscheck module 106 for comparing the data transmitted by the data transfer module 104 and the data received by the data receiving module 105 with each other for crosscheck.

In the software group 200 executed on a backup destination site, servers of the proximal site 2 and the remote site 3 have the same structure as the application server 10A of FIG. 1. The only difference between the server of the proximal site 2 and the server of the remote site 3 is reception and transmission destination determined by role definition, which will be described later, and the two servers carry out identical processing.

The software group 200 is composed of a data receiving module 201 for receiving backup data and role definition transmitted, a role definition analyzing module 202 for analyzing the received role definition and ruling the server operation based on the role definition, a data write module 203 for writing the received backup data in the storage system 12A, and a transfer module 204 for transmitting the written data to the next backup destination or to the sender (currently-used site 1).

The role definition module 101 run on the application server 10A of the currently-used site 1, which is the sender, determines in what order backup data is to be transmitted from the currently-used site 1 as the sender, and what processing is to be performed in the respective sites. Such definition is set as a table shown in FIG. 5, for example.

In the table of FIG. 5 given as an example, the remote site 3 is defined as the transmission (transfer) destination of backup data of the currently-used site 1 serving as the sender, the proximal site 2 is defined as the transfer destination of data of the remote site 3, and the currently-used site 1 is defined as the transfer destination of data of the proximal site 2.

The table of FIG. 5 also instructs about processing on data received by the respective sites. For the currently-used site 1, transferring (transmitting) data and crosschecking received data against transmitted data are defined as processing to be made. For data received by the remote site 3, writing the received backup data in the storage system and transferring the written data are defined as processing to be made. Similarly, backup data received by the proximal site 2 is written in the storage system and the written data is transferred according to the definition.

With the role definition of FIG. 5, when data is written in the storage system 12A of the currently-used site 1, the written data is transferred to the remote site 3 which is the transfer destination allotted for the currently-used site 1 as shown in FIG. 3. The remote site 3 writes the data received from the currently-used site 1 in the storage system and transfers the written data to the proximal site 2. The proximal site 2 writes the data received from the remote site 3 in the storage system and transfers the written data to the currently-used site 1. The currently-used site 1 compares the data received from the proximal site 2 with the data transmitted to crosscheck whether the two matches or not (in other words, whether data looped through the sites is correct or not). If it is found as a result of the crosscheck that the two do not match, given processing such as retransmission of backup data is executed as will be described below.

Figure 6:
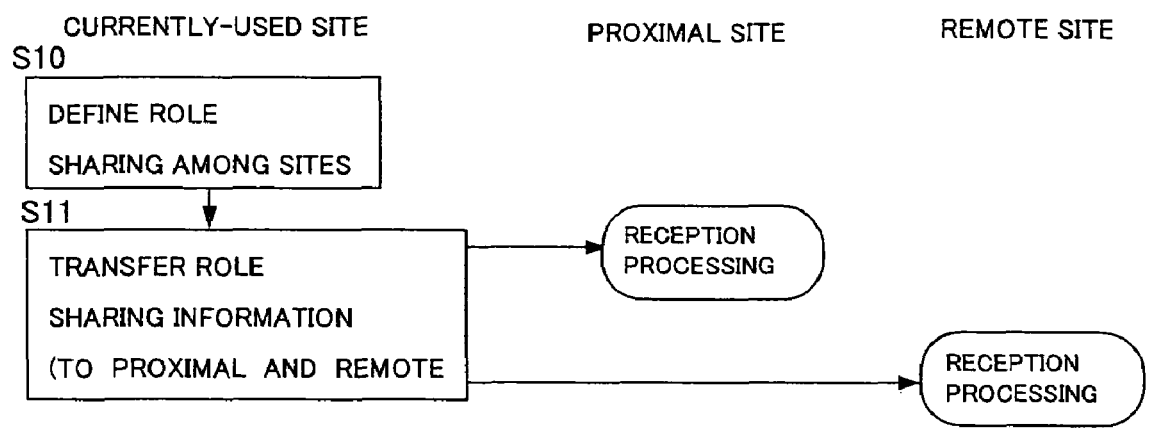
FIG. 6 is an explanatory diagram showing a flow of processing of a role definition unit.

Processing defined by the role definition module 101 is composed as shown in FIG. 6. Upon starting the software group 100, the application server 10A of the currently-used site 1 runs the role definition module 101 first to read the role definition of FIG. 5 (S10) and to transmit to the proximal site 2 and the remote site 3 their respective processing after reception and data transfer destinations (S11).

In other words, based on the table of FIG. 5, the currently-used site 1 transmits to the proximal site 2 role definition (role sharing information) which defines write and transfer of data received as processing after data reception and which defines the currently-used site 1 as the transfer destination. Similarly, the currently-used site 1 transmits to the remote site 3 role definition (role sharing information) which defines writing and transfer of data received as processing after data reception and which defines the proximal site 2 as the transfer destination.

Figure 7:
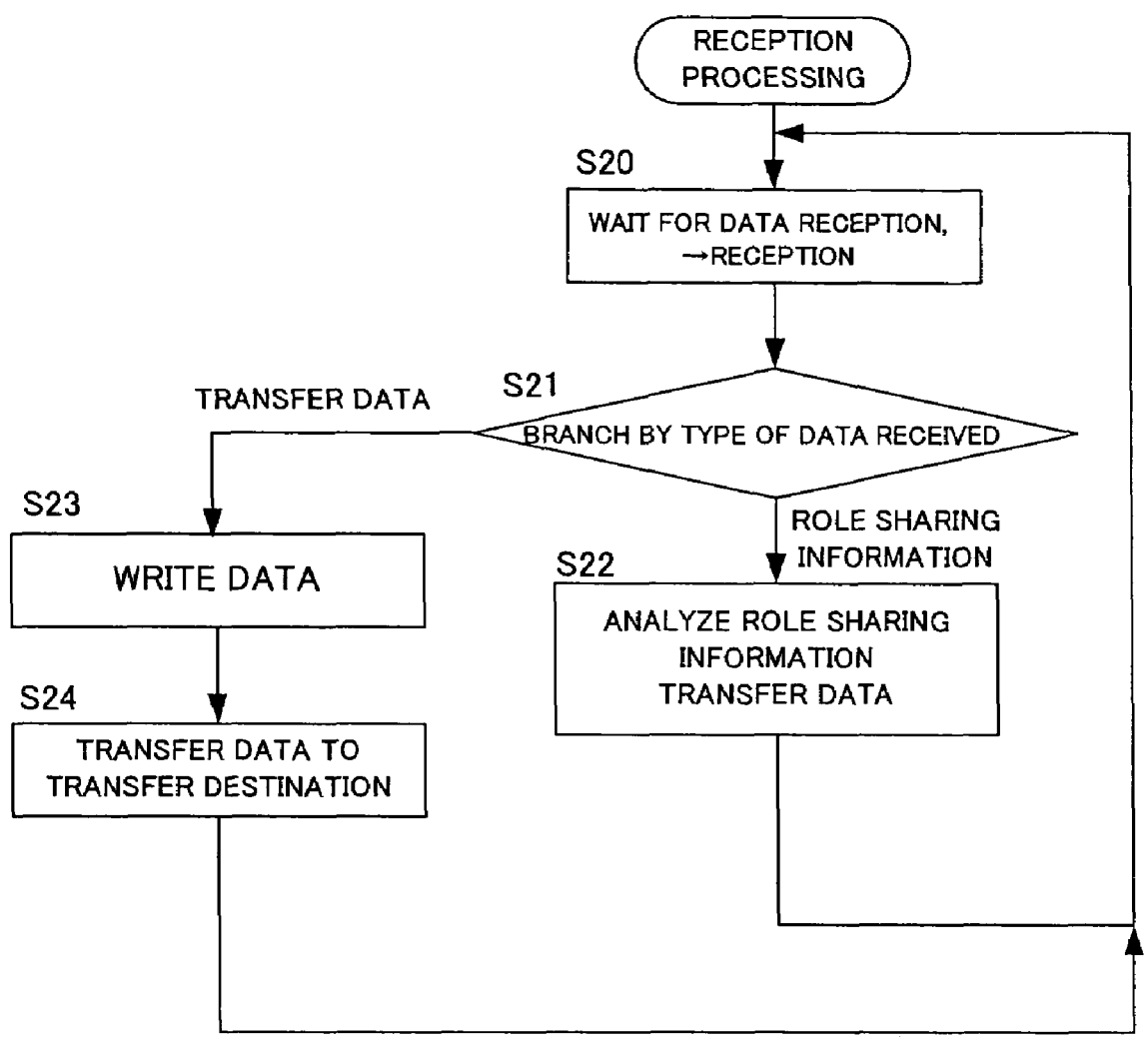
FIG. 7 is a flow chart showing an example of processing performed in a backup site.

Described next referring to a flow chart of FIG. 7 are details of the software group 200 executed on the servers of the proximal site 2 and the remote site 3.

FIG. 7 shows the data receiving module 201, the role analyzing module 202, the data write module 203, and the data transfer module 204 which are shown in FIG. 4. First, in step S20, data from the sender is waited for and reception of the data advances the process to step S21, where the data received is identified for branch processing according to data type.

In step S21, when the received data is role definition (role sharing information), the process proceeds to step S22 whereas processing of step S23 is chosen when the received data is transfer data (backup data).

In step S22, a site to which the data is to be transferred next and what processing is to be made on the received data are set based on the received data which is role definition. For instance, in the remote site 3, the role definition (the table of FIG. 5) transmitted from the currently-used site 1 sets the proximal site 2 as the data transfer destination and sets write and transfer as processing after reception. Thereafter, the process is returned to step S20 to wait for the next data.

On the other hand, in step S23, the received data, which has been determined as transfer data (backup) in step S21, is written in the storage system. The written data is transmitted to the transfer destination set in step S22.

Through the above processing, the proximal site 2 and the remote site 3 set their transfer destinations and contents of processing to be made on received data based on the role definition which has been received from the currently-used site 1. After that, writing data in the storage system 12A of the currently-used site 1 starts backup processing in each site following a procedure shown in FIG. 8. The point at which a write instruction is transmitted from the application server 10A and received by the control module 121 of the storage system 12A is deemed as completion of data writing.

There are various methods to synchronize data among plural sites. Shown here is an example of using snapshot as the synchronization method.

In the application server 10A of the currently-used site 1 as the sender, a snapshot is created after data is written in the storage system 12A to create data management information, which will be described later. Then the data is transferred to the remote site 3 defined as the transfer destination as shown in FIG. 8.

The snapshot created is for a file, block, or volume written in the storage system 12A.

When creating a snapshot for the first time, a snapshot of all data is created and transferred. In the second and subsequent creation of snapshot, data that is updated alone is transferred. This means that, upon start of backup, a snapshot of all data is created and every data is transferred to other sites whereas a snapshot is created for a differential of data and the data differential is transferred to other sites for backup from the next time on.

Figure 8:
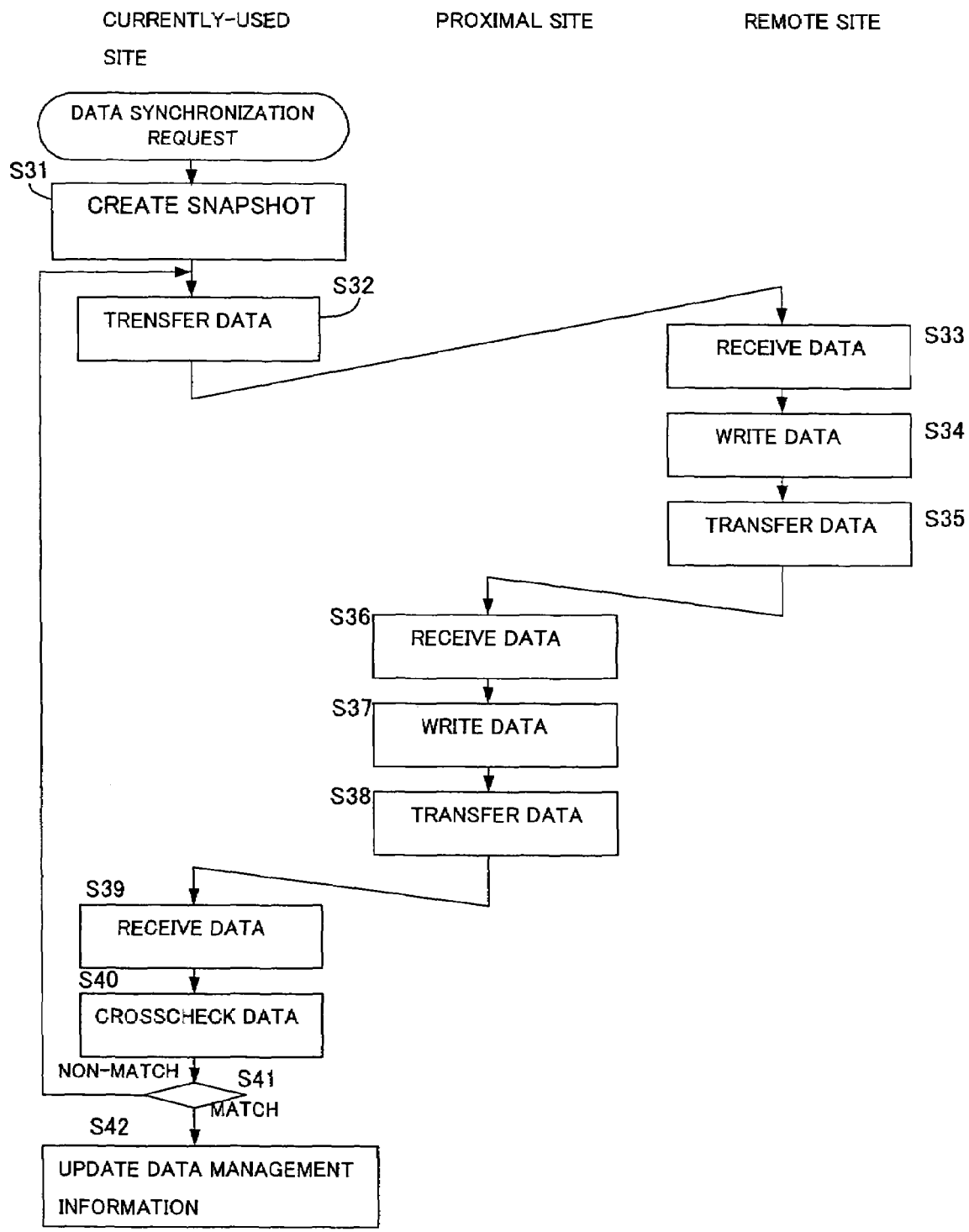
FIG. 8 is a flow chart showing a data flow between sites.

FIG. 8 is a diagram showing a data flow between sites.

In the currently-used site 1, synchronization request processing for creating a snapshot of data is carried out in step S31 when the backup system (software group 100) is started or otherwise initialized and when a request is made to create a snapshot.

The synchronization processing includes, as described later, creating a snapshot that indicates the physical location (the location in the storage system 12A) of data to be backed up, creating identification information (for example, information unique to data such as time stamp and address), and holding the created data as management information for crosscheck of written data after the data is backed up on other sites (processing carried out by the data management module 102 of FIG. 4).

Then the application server 10A transfers the written data and the management information attached thereto to the remote site 3, which is the transfer destination determined by the role definition (S32, the data transfer module 104 of FIG. 4).

The server of the remote site 3 processes the received data as the role definition dictated following the flow chart of FIG. 7. To elaborate, after receiving the data (S33), the server of the remote site 3 writes the received data in the storage system to execute backup (S34). Then the server transmits the data written in the storage system to the proximal site 2, which is the transfer destination determined by the role definition (S35).

The data transmitted from the remote site 3 is received by the server of the proximal site 2 (S36). The server of the proximal site 2 processes the received data as the role definition dictates following the flow chart of FIG. 7. To elaborate, after receiving the data (S36), the server of the proximal site 2 writes the received data in the storage system to execute backup (S37). Then the server transmits the data written in the storage system to the currently-used site 1, which is the transfer destination determined by the role definition (S38).

The data transmitted from the proximal site 2 is received by the application server 10A of the currently-used site 1 (S39). The application server 10A of the currently-used site 1 processes the received data as the role definition dictated with the use of the software group 100 of FIG. 4. To elaborate, after receiving the data (S39, the data receiving module 105), the application server 10A compares the management information of the received data with the data management information kept in step S31 to crosscheck whether or not the data transmitted from the currently-used site 1 matches the data returned after backup to two sites. (S40, the data crosscheck module 106 of FIG. 4).

When it is found as a result of the crosscheck that the two match, the data management information is updated in step S42 whereas, when the two do not match, the process returns to step S32 to transmit anew the data that has failed the crosscheck (S41). After the data management information is updated in step S42, backup processing for next data is started.

As described, data written in the currently-used site 1 is backed up to the proximal site 2 and the remote site 3 separately after management information unique to the data is attached to the data, so that the management information of the transmission data kept by the sender is compared with management information contained in data which has been looped through the sites and which has been received from the proximal site 2. In this way, whether the data is correctly backed up or not can readily be crosschecked.

This means that the load required for crosscheck is not influenced by the number of sites to which data is backed up since, in the case of crosschecking data on the currently-used site 1, which is the sender of backup data, the currently-used site 1 only has to compare management information of data received from a site where the data is backed up last with management information of the data transmitted which has been kept in the currently-used site 1 irrespective of the number of backup sites.

The processing in steps S31 and S32 and the processing from steps S39 to S42 are carried out by the data management module 102 to the data crosscheck module 106 of the software group 100 of FIG. 4 which is executed on the application server 10A of the data sender.

Given next is a description of data management information created by the application server 10A of the currently-used site 1.

Figure 9:
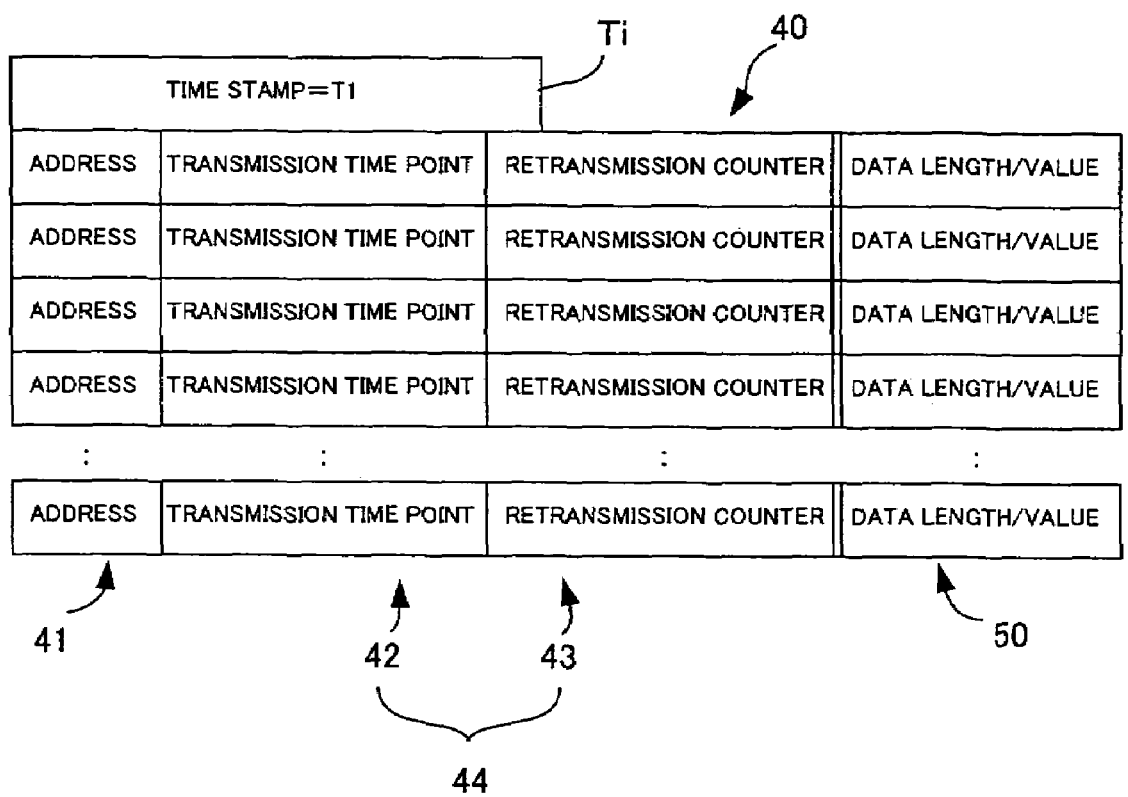
FIG. 9 is an explanatory diagram showing an example of a management list.

An example of data management information is shown in FIG. 9. The data management information uses a time point Ti at which a snapshot is created and which serves as time stamp. The time stamp makes the index of the management information. A management list 40 of FIG. 9 contains the length and value of data, additional information 44 (transmission time point 42 and retransmission counter 43), and data address 41. Data management information is added to the management list 40 for each time stamp Ti, in other words, whenever data is written in the currently-used site 1 and a snapshot is created. To elaborate, columns in the drawing each of which is composed of the address 41, the additional information 44, and data 50 are sequentially created with one column as one entry (record). Plural entries are managed by their time stamp Ti.

Figure 10:
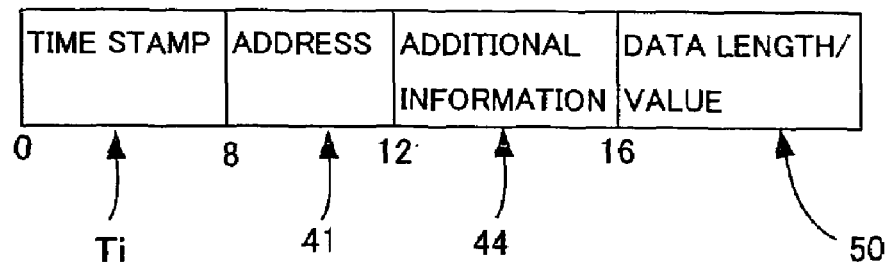
FIG. 10 is an explanatory diagram showing an example of data to be transferred.

Data transfer processing is as shown in FIG. 10. The management information (the time stamp Ti, the address 41, and the additional information 44) is added in a preset data format to the data 50 and the data is then transmitted to the remote site 3.

FIG. 10 shows a data format example in which the time stamp Ti constitutes a section from the header (0 byte) of data to be transferred to 8 bits, the address 41 constitutes a section up to 12 bits, the additional information 44 constitutes a section up to 16 bits, and the data 50 including the data length is stored in a section from 17 bits and on.

An example of management information is given now. The time stamp Ti is composed of, for example, year, month, date, time, minute, second +1/100 second. If a snapshot is created on Oct. 29, 2003 at 9:53:2:78, the time stamp is expressed as "2003102909530278".

The address 41 of the data 50 is expressed by the logical location in a file system or the physical location in the storage system 12A. For instance, when the address 41 is expressed by logical location, "file_a10" is expressed as "/nas/data/dir_a/file_a10". For the data value, in the case of text data, "NAS backup method examples" and the like are stored.

The retransmission counter 43 indicates the number of times data is re-transferred due to non-match crosscheck results. The additional information 44 may include a counter indicating the number of timeout (in which transferred data fails to return in a given period of time), a counter indicating the number of non-match crosscheck results, or the like. Although the additional information 44 includes the transmission time point 42 in the example shown here, the transmission time point 42 may be omitted if data to be transferred is managed by the time stamp Ti.

In the management list 40 here, a group associated with the time stamp Ti may include data written in the currently-used site 1 at different timing. For instance, a first data block (e.g., block 1) is written in the storage system 12A and then is registered to the management list 40 in preparation of transfer. In registering the block 1 to the list, a time stamp T1 at which a snapshot is created is stamped on the block 1. Then a second data block (block 2) is written in the storage system 12A and, upon transfer, is registered to the management list 40. If at this point the snapshot created at the time stamp T1 includes the block 1 and the block 2, the block 1 and the block 2 constitute a group of the management list 40 which has the same time stamp Ti as the index.

The snapshot and the management list 40 which are created by the above snapshot creating processing and data management information creating processing are stored in given area of the memory of the application server 10A or the storage system 12A shown in FIG. 1. The snapshots and the entries in the management list 40 are deleted when crosscheck results match as described later.

Figure 11:
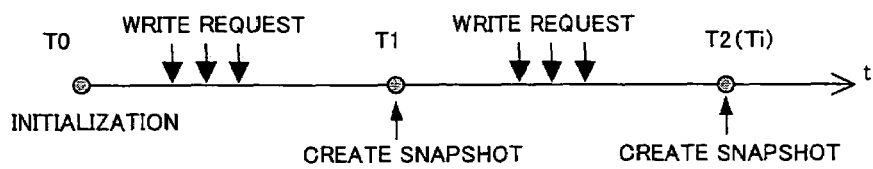
FIG. 11 is a time chart showing timings of snapshot and writing.

FIG. 11 is a time chart showing an event where this backup system is put into operation.

As the backup system is started at a time stamp T0, initialization is performed first.

In this initialization processing, steps subsequent to step S10 of FIG. 6 are executed to distribute role sharing information throughout sites to which data is to be backed up. Thereafter, a snapshot of all data is created by processing described later and by the data synchronization request of FIG. 8 to synchronize data of the currently-used site 1 with data of the proximal site 2 and the remote site 3 to which data is to be backed up.

After that, receiving a write request, the application server 10A stores data in the storage system 12A before creating a snapshot of data updated at the time stamp T1.

Since data has been synchronized among the sites at the time of initialization processing, differential data alone is transferred for data synchronization among the sites in creating a snapshot from the time stamp T1 on. When a write request is received to the currently-used site 1, it only has to manage differential data and the load of processing the write request can be reduced.

Figure 12:
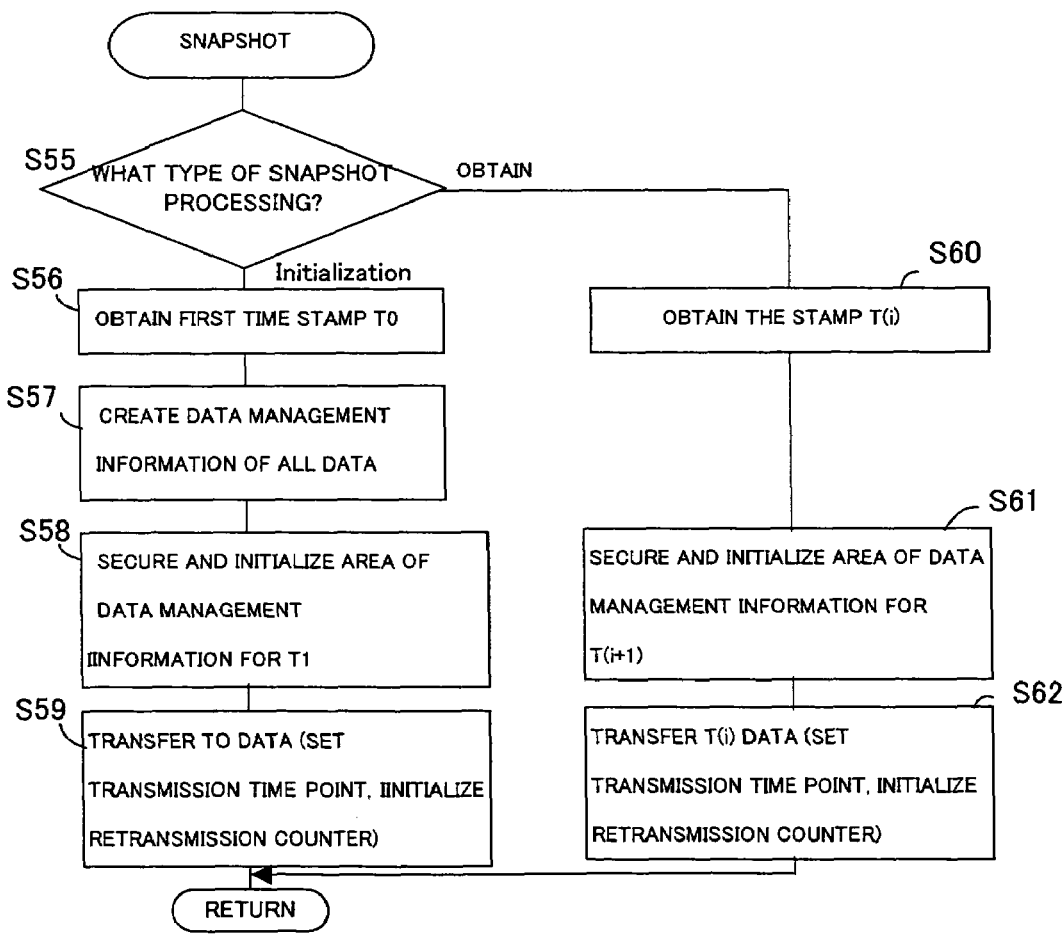
FIG. 12 is a flow chart showing processing of creates a snapshot.
Figure 13:
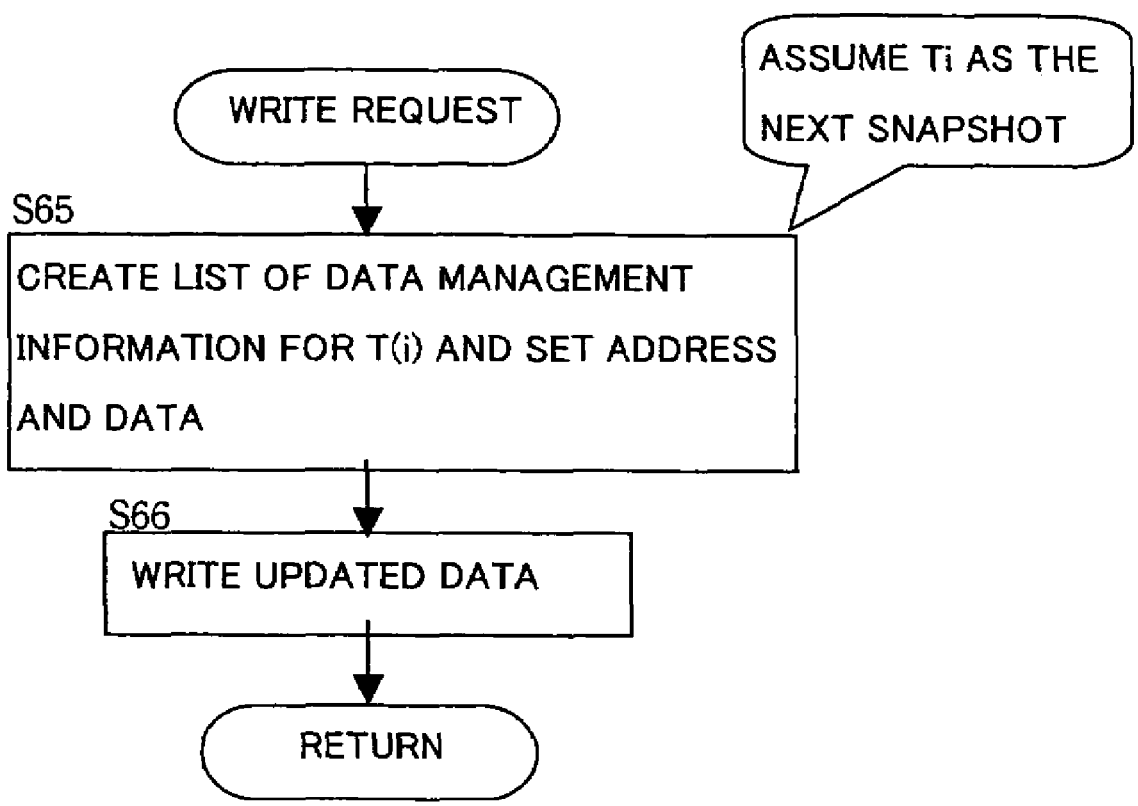
FIG. 13 is a flow chart showing an example of Write request processing.

Referring to flow charts of FIGS. 12 and 13, a description is given on details of the above snapshot creating processing, data management information creating processing, and data transfer processing.

The first step in FIG. 12 is step S55 in which whether the snapshot processing type is initialization or not is determined. In the case of initialization, the process proceeds to step S56. After completion of initialization, the snapshot processing type is determined as normal snapshot creating processing and the process proceeds to step S60.

Upon initial start of this backup system, target data is initialized so that "no snapshot of the target data has been created yet". This state is determined at the time of creating a snapshot. The target data can be file-unit data, volume-unit data, or the like as described above.

In the initialization processing of step S56, 'i' in the first time stamp Ti is set to 0 and a snapshot is created as the time stamp T0. In step S57, data management information is created for all data. Then, in step S58, area for the management list 40 and for a snapshot which are to be used at the next time stamp T1 are created and initialized.

In step S59, the data created for the time stamp T0 in step S57 is transferred to the remote site 3. Upon transferring the data, current time is written as the transmission time point 42 in the management list 40 and the value of the retransmission counter is initialized.

In step S60 for the second and subsequent snapshot createing processing, a time stamp T(i) is created and the latest snapshot time is created as well in order to take a backup after a write request is received to the application server 10A as shown in FIG. 1.

In step S61, area for the management list 40 and for a snapshot which are to be used at the next time stamp T(i+1) are created and initialized. In the second and subsequent snapshot creating processing, a snapshot of updated data is created by write request processing, which will be described later.

In step S62, the data created for the time stamp T(i) in step S60 is transferred to the remote site 3. Upon transferring the data, current time is written as the transmission time point 42 in the management list 40.

Referring to the flow chart of FIG. 13, processing performed upon the write request of FIG. 11 is described next.

When the application server 10A receives the write request, address of this data and management information containing the data are created in step S65. In other words, an entry of management information having the next time stamp T(i) as the index is added to the management list 40.

In step S66, an instruction is issued to write this data to the storage system 12A.

Through the processing of FIGS. 12 and 13, a write request after completion of initialization starts creation of management information of data to be written which is followed by creating of the time stamp T(i) and a snapshot as well, and the data written in the currently-used site 1 is transmitted to the remote site 3 based on role definition (role sharing information).

When management information of T(i+1) is created by the write processing (FIG. 13), it is required, each time data is written, to determine whether or not management information is already created in order to create area for the next data in steps S58 and S61. This could prolong data writing processing. The write processing can be made lighter by using the snapshot creating processing to create area since creating data management information is approximately equivalent with creating a snapshot.

Through the processing of step S65, original data (transfer data) to be compared is stored in data management information and relevant data is taken out of the data management information for comparison in the crosscheck processing.

Data contents at the time stamp Ti are therefore kept in data management information so that data contents of the currently-used site 1 at the time stamp Ti can be synchronized with other sites and so that no problem is raised from writing data of the same address at a time stamp subsequent to the time stamp Ti over the data at the time stamp Ti.

In short, in the case where data is updated several times at the same address in the storage system of the currently-used site 1, data (value) of the data management information list that has the same address is written over by the processing of step S65.

Figure 14:
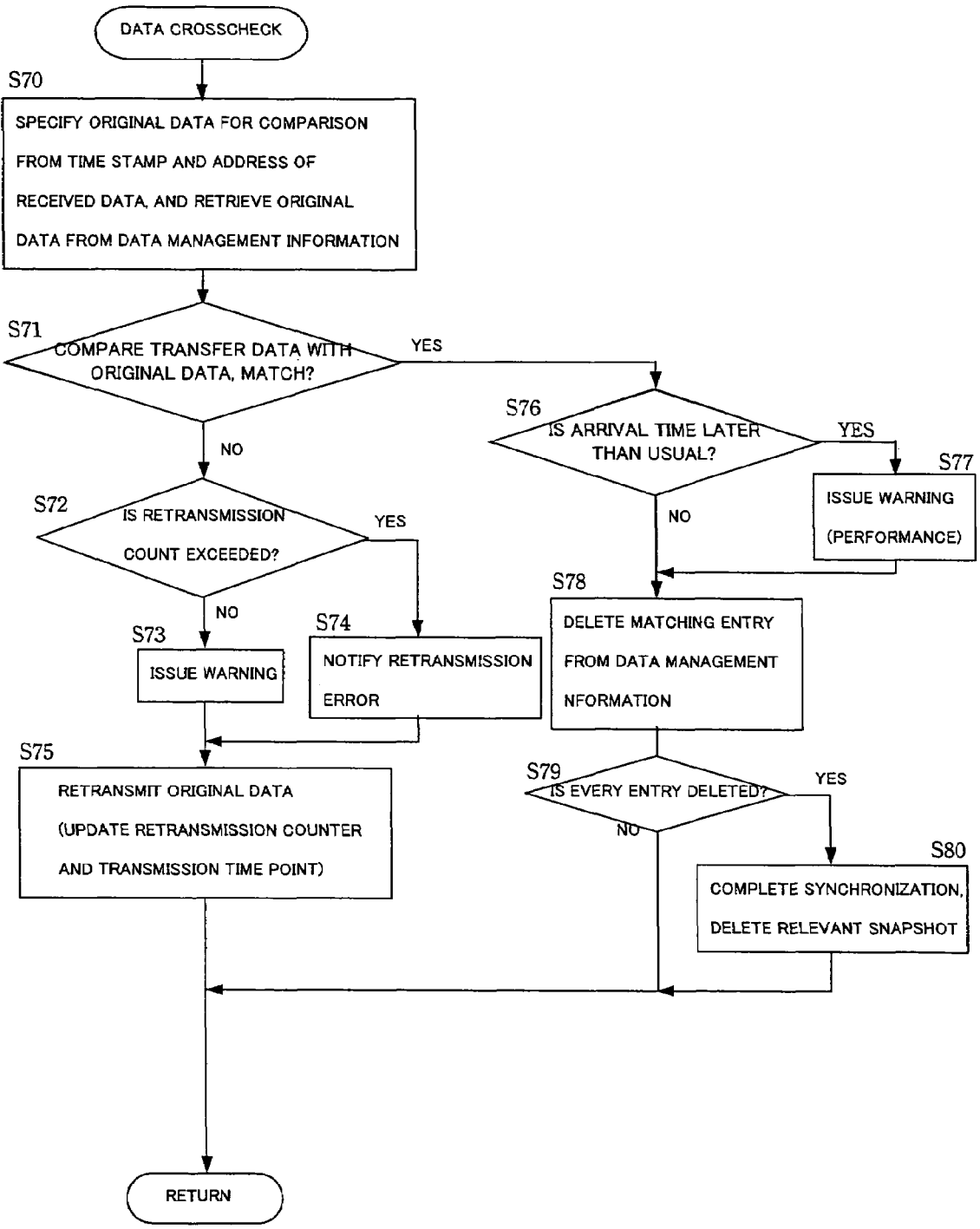
FIG. 14 is a flow chart showing an example of data crosscheck processing.

A detailed description is given next with reference to a flow chart of FIG. 14 on the data crosscheck processing carried out in step S40 of FIG. 8.

In step S70, the time stamp Ti and the address 41 are extracted from management information of data transmitted from the proximal site 2 and received by the application server 10A as shown in FIG. 10. Then the management list 40 is searched with the time stamp Ti as the index to extract data that has matching address 41 from the relevant entry stamped with the time stamp Ti.

In step S71, the received data is compared with the data 50 of the management list 40 to determine whether the two match or not.

To compare the received data with the data 50 kept in the management list 40, the two may be crosschecked for bit by bit, or checksum may be created upon transmission and compared for crosscheck of the data. Alternatively, a part of the received data may be compared with a part of the data 50 for crosscheck. For instance, a section from the header of the data to a given bit number, a section from the tail of the data to a given bit number, a section stretching over a data border for a given number of bits, or the like may be used for crosscheck. The data border refers to the border between data blocks, the border between packet data, and the like.

When the received data and the data 50 of the management list 40 coincide with each other, the process proceeds to step S76 whereas the process proceeds to step S72 when the two do not match.

In step S72 where received data which returns after being looped through the sites does not match the data 50 of the management list 40, the retransmission counter 43 of the management list 40 is read to whether or not the read count of the retransmission counter 43 exceeds a given retransmission count.

When the read count of the retransmission counter 43 exceeds the given retransmission count, the process proceeds to step S74 to notify a not-shown display device or the like of the application server 10A of a retransmission error (notification of the fact that the given retransmission count is exceeded). In this way, an administrator of the application server 10A or the like can be notified of several malfunctions that have taken place in the process of looping backup data from the currently-used site 1 through the remote site 3 and the proximal site 2.

When the given retransmission count is not exceeded but there is a retransmission error, the process proceeds to step S73 to warn a not-shown console or the like of the application server 10A of a data crosscheck error.

The process then proceeds to step S75 where the count of the retransmission counter 43 of the management list 40 is incremented and the transmission time stamp is updated to transmit the original data 50 again.

The processing of steps S72 to S75 corresponds to the processing of steps S39 to S41 and S32 shown in FIG. 8.

In step S76 where the data received from the proximal site 2 is determined in step S71 as matching the data 50 of the management list 40, the transmission time point 42 is extracted from the management information of the data 50 and is compared with the time stamp at which the data is received in step S70 to determine whether or not the arrival time (reception time point—transmission time point 42) exceeds a preset standard time.

When the arrival time exceeds the standard time, the process proceeds to step S77 to warn a not-shown display device or the like of the application server 10A of lowered performance of a backup site or an external network. The warning enables an administrator of the application server 10A or the like to surmise that there is an increase in traffic of the external network or the performance of the server is, for example.

In step S78, an entry for which the received data and the data 50 of the management list 40 coincide with each other is deleted.

In step S79, it is determined whether every entry with the time stamp Ti serving as the index of the data 50 has been deleted or not. When every entry that is managed by the time stamp Ti is completely deleted, the process proceeds to step S80 to delete the snapshot that corresponds to the time stamp Ti and to delete index of the time stamp Ti from the management list 40, thereby completing the processing. The processing of steps S78 to S80 corresponds to the data management information update processing of step S42 shown in FIG. 8.

With the data crosscheck processing, data which returns from being looped from the currently-used site 1 through the remote site 3 and the proximal site 2 is compared to the data 50 of the management list 40 which is created prior to transmission to crosscheck, upon the return of the data, whether or not a backup is correctly taken on each backup site. Since the application server 10A only has to crosscheck data from the site where a backup takes place last irrespective of the number of backup sites, an increase in number of backup sites does not lead to an increase in load of the application server 10A. Therefore, the crosscheck processing merely requires very small load even in a backup system that has a large number of backup sites.

Figure 15:
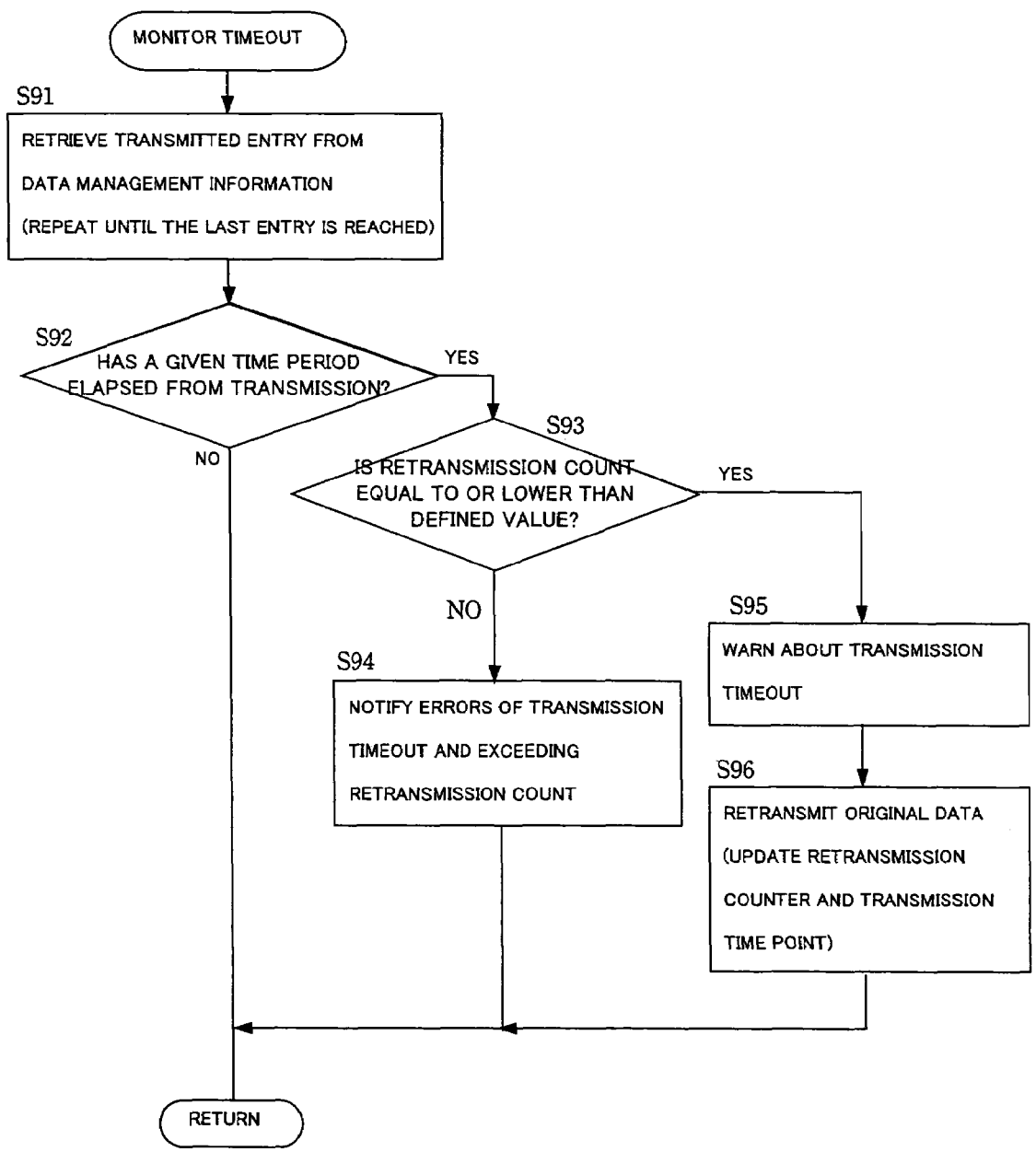
FIG. 15 is a flow chart showing an example of timeout monitoring processing.

FIG. 15 is a flow chart showing an example of timeout monitoring processing which is executed at regular time intervals (for instance, an interval of several hundreds msec.) on the application server 10A of the currently-used site 1.

In the currently-used site 1 which serves as a sender and where data transmitted and returned from looping is crosschecked at the time of the return, processing described below is carried out when the data is prevented from returning by failures in the backup sites 2 and 3 or in an external network.

First, in step S91, an entry with the transmission time point 42 is taken out of the management list 40 to compute a time difference between current time and the transmission time point 42.

In step S92, it is determined whether the created time difference exceeds a preset timeout determining value (a fixed time period) or not.

When the time difference is equal to or lower than the timeout determining value, the processing is ended. On the other hand, when the time difference exceeds the timeout determining value, the process proceeds to step S93 and the count of the retransmission counter 43 is read to determine whether or not the count of the retransmission counter 43 is equal to or lower than the preset retransmission count.

When the count of the retransmission counter 43 is equal to or lower than the given retransmission count, the process proceeds to step S95 to warn a not-shown display device or the like of the application server 10A that transmission timeout has taken place. Then the process proceeds to step S96 to transmit the data 50 again. Upon retransmission of the data 50, the count of the retransmission counter 43 is incremented and the transmission time stamp is updated in the relevant entry.

On the other hand, when the count of the retransmission counter 43 exceeds the given retransmission count, the process proceeds to step S94 to notify a not-shown display device or the like of the application server 10A that a transmission timeout error has taken place and that the retransmission count has exceeded the regulated count.

The processing of steps S91 to S96 is performed on the first through last entries of the management list 40 in order.

The above processing makes it possible to detect with precision that return of the data transmitted is inhibited by failures in the proximal site 2 and the remote site 3 to which data is to be backed up and in an external network, and to notify an administrator of the application server 10A or the like that the crosscheck processing cannot be carried out.

As has been described, according to the present invention, the currently-used site 1 serving as a sender of backup data transmits the backup data to a single site and receives data returned from being backed up to one or more sites. In this way, backup and crosscheck of backup data are achieved at very small processing load and data can correctly be backed up between plural sites while simplifying the management procedure of data update.

In addition, timeout monitoring processing is performed at regular time intervals and a warning is given when data cannot be received from the last backup site in the loop, thereby prompting an administrator of the application server 10A or the like to take an appropriate action.

The error alarm (notification) issued in step S94 of FIG. 15 may be replaced by processing that stops the backup system since in step S94 the retransmission count has exceeded the regulated count and a transmission timeout error has taken place which means that a backup site or an external network may have stopped operating.

Although the embodiment described above shows an example in which the application server 10A is connected to the storage system 12A via the intra network 11B, the backup processing can be carried out by the NAS servers 10C and 10D and file servers 10E and 10F shown in FIG. 1 instead of the application server 10A. Furthermore, the NAS servers 10C and 10D may be replaced by NAS heads.

MODIFICATION EXAMPLE 1

Shown in the embodiment described above is an example of creating a snapshot. Instead of creating a snapshot, a time point at which data is written in the storage system 12A may be used as the time stamp Ti. Alternatively, a time point at which management information is created may be used as the time stamp Ti to manage the management list 40.

The present invention is not limited to the use of the time stamp Ti and synchronization may be achieved in a manner that makes a backup site catch up with data contents of the currently-used site 1.

In this case, synchronization processing started upon a synchronization request (FIG. 8) lasts until data inconsistency between the sites is solved and the backup site only has to make its data contents match the latest data contents of the currently-used site 1 instead of synchronization based on a snapshot which is data contents at a specific time point. Of the data management information shown in FIGS. 9 and 10, the time stamp and the data 50 are thus made unnecessary and the information may be managed by the address 41. This means that the substance of data is not contained in data management information and that data stored in the address 41 that is specified by the data management information is created upon crosscheck. In this case, the path of creating a snapshot which is shown in FIG. 12 is unnecessary and, in step S65 of FIG. 13, the transmission time point 42 of the data management information is reset as data of the same address is written.

MODIFICATION EXAMPLE 2

Figure 16:
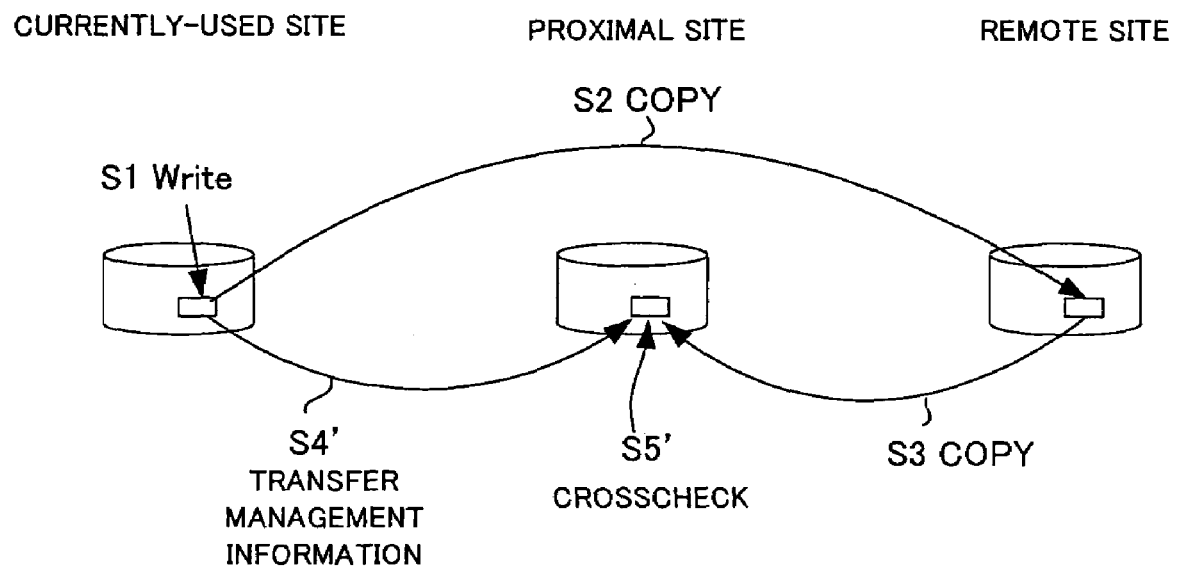
FIG. 16 is an explanatory diagram of a modification example showing a data flow for crosscheck processing in a backup site.

Backup data is looped to the sender for crosscheck in the embodiment described above. Alternatively, a sender of backup data and a site which performs crosscheck may be separate sites as shown in FIG. 16. In FIG. 16, the currently-used site 1 transfers backup data to the remote site 3 and at the same time transfers management information (the management list 40) to the proximal site 2, which is the last backup site in the loop.

Receiving data from the remote site 3, the proximal site 2 writes the data in the storage system and then executes processing similar to the one in the above embodiment to crosscheck the written data against the management list 40 received from the currently-used site 1.

This makes it possible to further reduce the load of the application server 10A of the currently-used site 1 serving as a sender of backup data, and the response of the application server 10A of the currently-used site 1 can be improved in write processing or the like.

In the case where there are plural backup sites as this, data crosscheck can be performed by a sender site or any one of the backup sites. Preferably, the last backup site in the loop performs the crosscheck since this way the data consistency can be ensured.

The role of the respective sites can be changed at any time according to the role definition shown in FIG. 5. It is therefore possible to change the flow of backup loop and the site that performs crosscheck arbitrarily by merely changing the processing after reception of data and the data transfer destination in the role definition as long as the software group 100 is set in each site.

MODIFICATION EXAMPLE 3

In FIG. 1, the currently-used site 1 and the proximal site 2 are connected through an external network. Instead, the same SAN 11B may be used to connect the storage system of the currently-used site 1 and the storage system of the proximal site 2.

In this case, the backup system (the software groups 100 and 200) may be run on the application server 10A as in the above embodiment or may be run by the control module 121 of the storage system 12A. The latter makes it possible to reduce the load of the application server 10A even more and, in addition, the storage system 12A can improve the overall performance of the backup system by communicating with another storage system 12A via the same SAN 11B at high speed.

MODIFICATION EXAMPLE 4

The servers of the respective sites in the above embodiment are connected to one another through an external network. Alternatively, the control module 121 of the storage system 12A on one site may be connected to the control module 121 of another site through an external network, so that the software group 100 or 200 of the above embodiment is executed by each control module 121.

The storage system 12A in the above example has disk drives, which may be replaced by tape devices or optical disk drives.

The address 41 as management information may be the physical storage position in the storage system 12A instead of the file position employed in the above embodiment.

When the address is the physical storage position, the currently-used site 1 and other sites usually have to have an identical physical configuration and therefore the same data is stored at the same address in the respective sites. On the other hand, when the address is logical information, the sites do not need to have an identical physical configuration.

While the present invention has been described in detail and pictorially in the accompanying drawings, the present invention is not limited to such detail but covers various obvious modifications and equivalent arrangements, which fall within the purview of the appended claims.

What is claimed is:

1. A data backup method for a data backup system including a first system and a second system, the first system storing data on which a write request is made and transmitting the data to the second system, the second system storing the data received from the first system, the method comprising the steps of:

storing the data in the first system and transmitting the data stored in the first system to the second system;
  storing the data received from the first system in the second system;
  transmitting the data stored in the second system to the first system;
  determining data match/non-match by crosschecking the data received by the first system from the second system against the data transmitted from the first system to the second system; and transmitting the data again from the first system to the second system when it is determined that no data match is found.

2. The data backup method according to claim 1, wherein the first system adds, to the data on which a write request is made, identification information unique to the data before transmitting the data to the second system, and wherein the step of determining data match/non-match includes the step of extracting the identification information from data that is received from the second system and crosschecking the extracted identification information against the identification information that is added to the data.

3. The data backup method according to claim 2, further comprising the step of adding, to the data on which a write request is received, identification information unique to the data, transmitting the data to the second system, holding a table that stores the identification information, and deleting, from the table, the identification information corresponding to the data that has been crosschecked, the step being performed by the first system.

4. The data backup method according to claim 1, wherein the step of determining data match/non-match includes the step of storing, in a table set in the first system, a result of crosschecking the data received from the second system against the data to which a write request is received.

5. The data backup method according to claim 1, further comprising the steps of:
  storing a data transmission time at which the data is transmitted;
  determining whether or not a predetermined period of time has elapsed since the data transmission time; and
  transmitting the data again when it is determined that the predetermined period of time has elapsed, the steps being performed by the first system.

6. The data backup method according to claim 1, wherein the first system comprises a first computer and a first storage system connected to the first computer, wherein the step of storing the data includes issuing an instruction from the first computer to the first storage system to write the data on which a write request is received, and wherein the step of transmitting includes transmitting, to the second system, the data that the first storage system is instructed to write.

7. The data backup method according to claim 1, wherein the second system comprises a second computer and a second storage system connected to the second computer, wherein the step of storing the data includes instructing the second system to write the data received from the first system, and wherein the step of transmitting includes transmitting, to the first system, the data that the second storage system is instructed to write.

8. The data backup method according to claim 1, wherein the first system comprises a control module and a second storage system having a storing module in which data is stored, wherein the step of storing the data includes issuing an instruction from the control module to the storing module to write the data received from the first system, and wherein the step of transmitting includes transmitting, from the control module to the second system, the data that the storing module is instructed to write.

9. The data backup method according to claim 1, wherein the second system comprises a control module and a second storage system having a storing module in which data is stored, wherein the step of storing the data includes issuing an instruction from the control module to the storing module to write the data received from the first system, and wherein the step of transmitting includes transmitting, from the control module to the first system, the data that the storing module is instructed to write.

10. A program for performing data backup by storing in a first system data on which a write request is received and transmitting the data to a second system, the program causing the first system to execute the processings of:
  storing the data and transmitting the data to the second system;
  receiving the data transmitted from the second system;
  determining data match/non-match by crosschecking the data received by the second system against the data transmitted to the second system; and
  transmitting the data to the second system again when it is determined that no data match is found.

11. The program according to claim 10, wherein the processing of transmitting the data to the second system includes the processing of adding, to the data on which a write request is received, identification information unique to the data, and wherein the processing of determining data match/non-match includes extracting the identification information from data that is received from the second system and crosschecking the extracted identification information against the identification information that is added to the data.

12. The program according to claim 10, wherein the processing of adding identification information unique to the data includes the processings of:
  storing the identification information in a table set in advance; and
  deleting from the table the identification information corresponding to the data that has been crosschecked.

13. The program according to claim 10, wherein the processing of determining data match/non-match includes the processing of storing, in a table set in the first system, a result of crosschecking the data received from the second system against the data to which a write request is received.

14. The program according to claim 10, wherein the program further causes the first system to execute the processings of:
  storing a data transmission time at which the data is transmitted to the second system;
  determining whether or not a predetermined period of time has elapsed since the data transmission time; and
  transmitting the data again when it is determined that the predetermined period of time has elapsed.

15. A data backup system comprising:
  a first system which stores data on which a write request is received, and which transmits the data to a second system; and
  the second system which stores the data received from the first system,
  the first system comprising a first storing module in which the data is stored and a first transmission module that transmits the data to the second system,
  the second system comprising a second storing module in which the data received from the first system is stored and a second transmission module that transmits the data stored in the second storing module to the first system,
  wherein the first system further comprises a reception module that receives the data from the second system and a crosscheck module that crosschecks the data received from the second system against the data transmitted to the second system to determine whether or not the two data match each other, and wherein the first system transmits the data to the second system again when it is determined by the crosscheck module that the two data do not match each other.

16. The data backup system according to claim 15, wherein the first transmission module adds, to the data on which a write request is received, identification information unique to the data before transmitting the data to the second system, and wherein the crosscheck module extracts the identification information from data that is received from the second system to crosscheck the extracted identification information against the identification information that is added to the data.

17. The data backup system according to claim 16, wherein the first system adds, to the data on which a write request is made, identification information unique to the data before transmitting the data to the second system, and wherein the first system has a table that stores the identification information and deletes, from the table, the identification information corresponding to the data that has been crosschecked.

18. The data backup system according to claim 15, wherein the crosscheck module stores, in a table set in the first system, a result of crosschecking the data received from the second system against the data to which a write request is received.

19. The data backup system according to claim 15, wherein the first transmission module comprises a timekeeping module that stores a data transmission time at which the data is transmitted, a timeout determining module that determines whether or not a predetermined period of time has elapsed since the transmission time point of the data, and a retransmission module that transmits the data again when it is determined by the timeout determining module that the predetermined period of time has elapsed.

20. A data backup system for writing data in a first processing system and storing the data in a second processing system and in a third processing system,
    wherein the first processing system comprises:
        a storing module that stores backup data which is a write request target;
        a transmission module that transmits, to the second processing system, the backup data and transfer data that contains address information, the address information indicating where the data is stored in the storing module;
        a reception module that receives the transfer data transmitted from the third processing system;
        a crosscheck module which, when the transfer data is received by the reception module, crosschecks the backup data that is contained in the received transfer data against the backup data that is stored at an address specified by the address information contained in the received transfer data; and
        a retransmission module which, depending on the result of the crosscheck by the crosscheck module, retransmits to the second processing system the transfer data containing the backup data that is stored in the storing module,
    wherein the second processing system comprises:
        a reception module that receives the data transmitted form the first processing system; and
        a transmission module that transfers, to the third processing system, the data received by the reception module, and
    wherein the third processing system comprises:
        a reception module that receives the data transmitted form the second processing system; and
        a transmission module that transfers, to the first processing system, the data received by the reception module.

21. A data backup system in which the same data is calculated among plural sites for backup,
    wherein a sender site stores data on which a write request is made, and transmits the data to a first backup site,
    wherein the first backup site stores the data received from the sender site and transfers the stored data to a second backup site,
    wherein the second backup site stores the data received from the first backup site and transfers the stored data to the sender site, and
    wherein the sender site crosschecks the data received from the second backup site against the data transmitted to the first backup site, and when the two data do not match each other, transmits the data to the first backup site again.

* * * * *